United States Patent [19]

Kramer

[11] Patent Number: 5,608,313
[45] Date of Patent: Mar. 4, 1997

[54] CIRCUIT ARRANGEMENT FOR GENERATING A CONSTANT OUTPUT VOLTAGE

[75] Inventor: Karl-Heinz Kramer, Wolfratshausen, Germany

[73] Assignee: Siemens Aktiengesellschaft, Munich, Germany

[21] Appl. No.: 490,248

[22] Filed: Jun. 14, 1995

[30] Foreign Application Priority Data

Jun. 24, 1994 [DE] Germany .................. 44 22 262.9

[51] Int. Cl.⁶ .................................................. G05F 1/46
[52] U.S. Cl. ........................ 323/269; 323/280; 323/281
[58] Field of Search ........................... 323/265, 269, 323/273, 280, 281

[56] References Cited

U.S. PATENT DOCUMENTS

| | | | |
|---|---|---|---|
| 4,035,716 | 7/1977 | Hutchinson | 323/271 |
| 4,658,201 | 4/1987 | Notohamiprodjo | 323/269 |
| 5,408,173 | 4/1995 | Knapp | 323/282 |
| 5,420,498 | 5/1995 | Kramer | 323/293 |
| 5,550,461 | 8/1996 | Pouzoullic | 323/269 |

*Primary Examiner*—Jeffrey L. Sterrett
*Attorney, Agent, or Firm*—Hill, Steadman & Simpson

[57] ABSTRACT

Circuit arrangement for generating a constant output voltage (U2), having a decoupling diode (17) of the output side and having an arrangement (20) for actual value formation that is connected to the output of the circuit arrangement. In order, given high precision of the output voltage (U2), to prevent voltages, that occur at the user (26) and are applied to the user (26) from elsewhere, from causing the regulator to inhibit the circuit arrangement, the arrangement (20) for actual value formation contains two transistor stages with complementary transistors (15, 11). The circuit arrangement is especially suited for redundant feed of equipment of electrical message transmission technology.

7 Claims, 1 Drawing Sheet

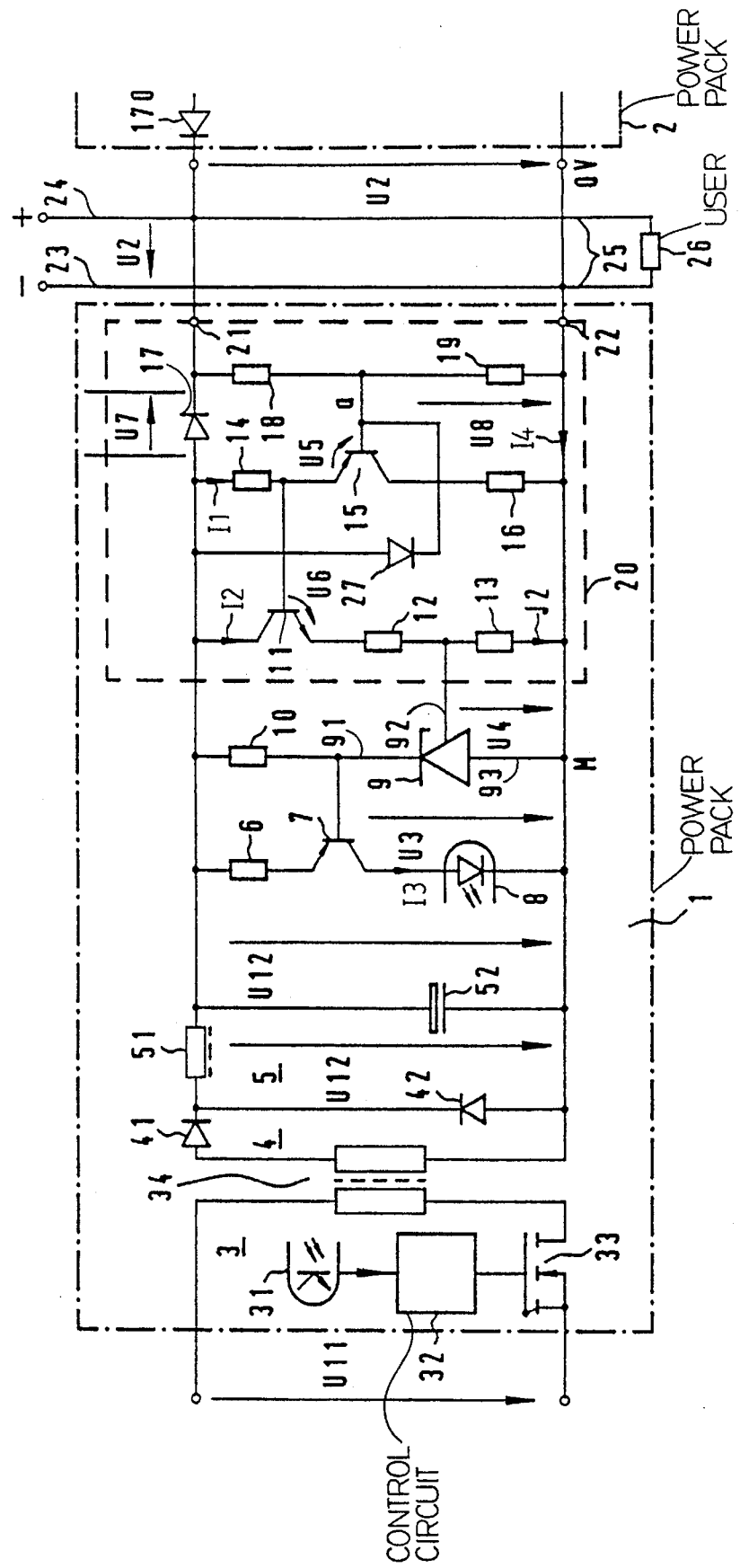

CIRCUIT ARRANGEMENT FOR GENERATING A CONSTANT OUTPUT VOLTAGE

BACKGROUND OF THE INVENTION

The present invention is directed to a circuit arrangement for generating a constant output voltage.

German reference DE-A1 92 114 237 discloses such a circuit arrangement. This publication discloses an arrangement having two identical frequency converters that feed a common load via decoupling diodes. Each of the two frequency converters is in the position to supply the load by itself. The frequency converter respectively comprises a regulator for regulating the output voltage to a constant value. The voltage regulator works in the sense that the deviation of an actual value voltage output by an arrangement for forming actual values from a reference voltage is optimally minimized. A voltage divider with whose assistance the actual value of the output voltage is acquired lies at the common load.

In order, given high precision of the output voltage, to prevent voltages that appear at the user and are applied to the user in some other way from initiating the regulator to inhibit the circuit arrangement, a reference potential terminal of the regulator lies at the one side of the decoupling diode and the voltage divider lies at the other side of the decoupling diode. An integrated circuit that, with reference to its reference potential terminal, processes positive actual value voltages serves as regulator. The positive pole of the output of the circuit arrangement lies at reference potential.

On the other hand, the arrangement for mixed value formation can be fashioned such that the actual value for the regulator is formed as a mixed value of the voltage preceding and following the decoupling diode. When a low tolerance of the output voltage is required, then the part of the voltage following the decoupling diode must predominate. In this case, however, the current supply device that is activated first inhibits the other. If the mixing ratio of the measured values is preselected in order to avoid this problem and is only 1:1 following the decoupling diode, then only a limited precision of the user voltage can be achieved, since the voltage drop-off at the decoupling diode is highly dependent on the temperature and on the load current.

SUMMARY OF THE INVENTION

It is an object of the present invention to provide a circuit arrangement for generating a constant output voltage from which an electrical user can be supplied via a decoupling diode such that, given comparatively high precision of the voltage to be made available, voltages applied to the user in some other way do not cause the regulator to inhibit the circuit arrangement, and such that the negative pull of the output of the circuit arrangement serves as reference potential.

In general terms the present invention is a circuit arrangement for generating a dc voltage regulated to a constant value. The circuit arrangement has two output terminals to which an electrical user and/or the output of at least one further, identical circuit arrangement can be connected. The circuit arrangement has one of the two output terminals lying at a reference potential. A decoupling diode in the current path is connected to the other output terminal. A regulator is connected to an arrangement for actual value formation, whereby the arrangement for actual value formation contains a first transistor whose base is connected to the tap of an ohmic voltage divider connected between the output terminals and whose emitter is connected via a resistor to the decoupling diode. The regulator, which has a reference voltage terminal, an actual value voltage input and a control voltage terminal, at least approximately eliminates deviations of the actual value voltage output by the arrangement for actual value formation from a reference voltage. The emitter of the first transistor is connected to the base of a second transistor whose collector is connected to the decoupling diode. The first transistor and the second transistor are opposite conductivity types. A series circuit of a resistor and the emitter-collector path of the second transistor lies between the actual value voltage input of the regulator and the decoupling diode. A resistor is connected between the actual value voltage input of the regulator and the output terminal lying at the reference potential. The control voltage output of the regulator is connected via a resistor to the decoupling diode.

The only voltage divider lying between the output terminals of the circuit arrangement can thereby be directly connected to the output terminals or can be directly connected to the electrical user to be supplied via its own instrument leads, i.e. can be indirectly connected to the output terminals of the circuit arrangement via a connecting line leading to the user. The circuit arrangement can initially serve by itself for supplying the electrical user.

Such an arrangement is suitable for being supplemented by another, identical circuit arrangement without particular measures, so that an apparatus for redundant feed of the user derives.

A circuit arrangement that is suitable for redundant feed and that has a decoupling diode leading to the positive pull of the output which, given comparatively high precision of the generated constant voltage, guarantees a decoupling of the regulator from voltages applied to the user in some other way derives as a result of the inventive measures. A further advantage is comprised therein that an especially far-reaching temperature compensation can be achieved both for the decoupling diode leading to the positive pull of the output as well as for the arrangement for actual value formation.

Advantageous developments of the present invention are as follows.

The first transistor and the second transistor can be complementary-identical transistors. The first transistor and the second transistor also can be tightly thermally coupled. In this case the base of a third transistor, in whose collector lead the light-emitting diode of an optocoupler is arranged, is operationally connected to the output terminal of the regulator.

BRIEF DESCRIPTION OF THE DRAWING

The features of the present invention, which are believed to be novel, are set forth with particularity in the appended claims. The invention, together with further objects and advantages may best be understood by reference to the following description taken in conjunction with the accompanying drawing, in which:

The single FIGURE depicts an apparatus for redundant feed of an electrical user via two decoupling diodes according to the present invention.

DESCRIPTION OF THE PREFERRED EMBODIMENTS

Given the apparatus shown in the single FIGURE, the electrical user 26 is connected to the bus bar 25. The bus bar is connected to the outputs of the two power pack devices 1 and 2. Both power pack devices 1 and 2 are respectively in the position to feed the user 26 by themselves. A redundant power supply for the user 26 derives in this way.

The main circuits of the power pack devices 1 and 2 each respectively contain a decoupling diode 17 or, respectively, 170 in the feed current path leading to the positive terminal 24 of the bus bar 25. Both power pack devices 1 and 2 are constructed in the same way. Further details are therefore shown in the single Figure only for one of the two power pack devices, namely for the power pack device 1.

The main circuit at the input side proceeds from the input for the dc voltage U11 via the primary winding of the transformer 34 and the power switch 33 in series therewith, the latter being the final control element of the control system. The power switch 33 is controlled with the control circuit 32 that is connected to the phototransistor 31 of the optocoupler 8, 31.

The main circuit at the output side proceeds from the output terminal 22 via the secondary winding of the transformer 34, the rectifier diode 41, the inductor 51 and the decoupling diode 17 to the output terminal 21. The free-wheeling diode 42 is arranged in the rectifier part 4 in a shunt arm that follows the rectifier diode 41. The storage capacitor 52 at which the dc voltage U12 appears is located in the filter element 5 in a shunt arm that follows the inductor 51.

The main circuit of the power supply device 1 at the output side is thus directly connected to the output terminal 22 and is connected to the output terminal 21 via the decoupling diode 17. The decoupling diode 17 thereby has its cathode connected to the output terminal 21.

The regulator 9 is a commercially obtainable, integrated circuit, for example of type TL 431 of the Motorola company. Such a regulator comprises a reference voltage terminal 93, an actual value input 92 and a control voltage output 91.

The regulator 9 contains a reference voltage source and outputs the control voltage U3 at the control voltage output 91. The control voltage output 91 is connected via the resistor 10 to the positive pull of the dc voltage U12. The reference potential terminal 93 of the regulator 9 is connected to the ground potential M. The base of the transistor 7 is connected to the control voltage output 91. The emitter of the transistor 7 is connected via the resistor 6 to the anode of the decoupling diode 17. The collector of the transistor 7 is connected to the reference potential M via the light-emitting diode 8 of the optocoupler 8, 31.

The arrangement 20 for actual value formation contains the voltage divider that lies between the output terminals 21 and 22 and is composed of the resistors 18 and 19, this voltage divider having the tap a. The arrangement 20 for actual value formation contains an arrangement having the two complementary transistors 11 and 15 in addition to the ohmic voltage divider 18, 19, the base of the transistor 15 lies at the tap a of the voltage divider 18, 19. The resistor 14 is connected between the emitter of the transistor 15 and the anode of the diode 17, and the resistor 16 is connected between the collector of the transistor 15 and the reference potential M.

The base of the npn transistor 11 is connected directly at the emitter of the pnp transistor 15. The collector of the transistor 11 is connected directly at the anode of the diode 17. The series circuit composed of the resistor 12 and 13 is connected between the emitter of the transistor 11 and the reference potential M. The actual value input 92 of the regulator 9 is connected at the junction of the resistors 12 and 13.

The currents I1, I2, and I3 flow in three current paths of the active arrangement 20 for actual value formation. The first current path wherein the current I1 flows is composed of the ohmic resistor 14. The second current path, wherein the current I2 flows, is composed of the collector-emitter path of the transistor 11 and of the resistors 12 and 13 lying in series therewith. The current I3 flows from the emitter of the transistor 7 via the light-emitting diode 8 of the optocoupler 8, 31 to the output terminal 22. The output current I4 flows in the main circuit of the output side of the power supply device 1.

The current paths of the main circuits of the power supply devices 1 and 2 leading to the negative terminal 23 of the bus bar 25 each respectively contain no decoupling diode. A decoupling diode 17 or, respectively, 170 respectively lies in the current paths of the main circuits of the output side that lead to the positive terminal of the bus bar 25. A relatively low dc voltage of high precision, for example a voltage of 5.0 volts having a tolerance of 2% lies at the bus bar 25. This output voltage U2 is a matter of a voltage that is positive compared to the negative terminal lying at reference potential.

The regulator 9 is a three-pull, integrated circuit that functions like an operational amplifier with integrated reference voltage source having a high-stability reference voltage of, for example, 2.49 V. With reference to its reference point, it only processes positive measured values.

The reference point for the control circuit is point M in the negative output line. The voltage potential 0 V is allocated to this point. The output terminal 21 receives positive potential, for example +5 V. A part of the output voltage U2 is taken at the tap a of the ohmic voltage divider 18, 19 and is supplied to the base of the transistor 15.

The actual value for the regulator 9 drops off as voltage drop-off I2·R13 at the resistor 13. This value is regulated such by the regulating means by adjusting the voltage U12 that it becomes equal to the internal reference of, for example, 2.49 V.

The active actual value forming unit 20 influences the current I2 such that the output voltage U2 decoupled from the voltage U12 with the diode 17 becomes independent of the voltage U7 that drops off at the diode 17.

Given optimum dimensioning, the arrangement 20 for actual value formation completely eliminates the influence that the voltage drop-off occurring at the decoupling diode 17 could have on the output voltage U2 to be kept constant.

It proceeds from the following calculation that the decoupled output voltage U2 is only dependent on the reference of the regulator 9 and on a resistance ratio.

The disturbing voltage drop-off U7 is completely eliminated and the base-emitter voltage U5 and U6 of the transistors 11 and 15 are eliminated in a first approximation. When the base-emitter voltages U5 and U6 agree with one another, then U5=U6 applies and the disturbing voltage drop-off U7 is completely eliminated.

The condition U5=U7 can be achieved in that complementary-identical transistors are employed for the transistors 11 and 15, for example transistors of the type BCW 66/68 that can be thermally well-coupled as SMD modules.

The following circuit analysis shows that the output voltage U2 is independent of the voltage drop-off U7 of the decoupling diode 17.

Denoting in the equations are:
R12 the value of the resistor 12,
R13 the value of the resistor 13, R14 the value of the resistor 14,
R18 the value of the resistor 18,
R19 the value of the resistor 19,
U2 the output voltage,
U3 the voltage at the control voltage output 91 of the regulator 9,
U4 the reference voltage of the regulator 9,
U5 the voltage at the base emitter path of the transistor 15,
U6 the voltage at the base-emitter path of the transistor 11,
U7 the voltage at the decoupling diode 17.

The following derives from the structure of the circuit arrangement:

$$I1 = \frac{U2 + U7 - U5 - U2 \cdot k}{R14} \quad (1)$$

$$\text{with } k = \frac{R19}{R18 + R19}$$

$$I2 = \frac{(U2 + U7) - I1 \cdot R14 - U6 - U4}{R12} \quad (2)$$

On the basis of appropriate dimensioning, $$R12 = R14 = R \quad (3)$$

is selected.

An employment of complementary-identical transistors 11 and 15 yields:

$$U5 = U6 = U. \text{ Further, } U8 = k \cdot U2 \text{ applies.} \quad (4)$$

$$I2 = \frac{(U2 + U7) - \frac{(U2 + U7) - U - U8}{R} \cdot R - U - U4}{R} \quad (5)$$

$$I2 = \frac{(U2 + U7) - (U2 + U7) + U + U8 - U - U4}{R} \quad (6)$$

$$I2 = \frac{U2 - U2 + U8 - U4}{R} \quad (7)$$

The regulator 9 regulates the output voltage U2 as a result thereof to a constant value that the relationship
$$U4 = U_{ref}$$
is achieved.

$$U4 = I2 \cdot R13 = \frac{U8 - U_{Ref}}{R} \cdot R13 = \frac{U8 \cdot R13}{R} - \frac{U_{Ref}}{R} \cdot R13 \quad (8)$$

$$U4 + U4 \frac{R13}{R} = U8 \frac{R13}{R} \quad (9)$$

$$U4 \left( 1 + \frac{R13}{R} \right) = U8 \frac{R13}{R} = U2 \cdot k \frac{R13}{R} \quad (10)$$

$$U2 = U4 \left( 1 + \frac{R13}{R} \right) \frac{R}{R13} \cdot \frac{1}{k} \quad (11)$$

$$U2 = \frac{U4}{k} \cdot \left( \frac{R}{R13} + 1 \right) \quad (12)$$

With the voltage values
U12=5.5 V, U$_{Ref}$=2.5 V, U6=0.6 V, UR2=1.2 V,
UR1=1.2 V, U5=0.6 V, U7=0.5 V,
U8=3.7 V derives, and $$k = \frac{3.7 \text{ V}}{5.0 \text{ V}} = 0.74$$

$$\frac{R}{R13} = 0.48 \text{ given } U_{Ref} = 2.5 \text{ V}$$

As the result (12) shows, the influence of the semiconductors 11, 15 and 17 on the output voltage U2 drops out. The temperature-dependent and current-dependent disturbance U7 is thereby entirely eliminated and the disturbances U5 and U6 are eliminated in a first approximation.

The condition U5=U6 assume for a complete compensation is particularly achieved in that identical-complementary transistors are employed as transistors 15 and 11. These transistors are preferably tightly thermally coupled as SMD (surface mounted device) modules.

The resistance ratio R18:R19 is expediently selected taking the optimum collector-emitter voltage for the transistor 15 into consideration.

Due to U5=U6≈0.6 V and Uce≧0.6 V, the lower limit value of the output voltage U2 derives as U2$_{min}$≧4.3 V.

When a module having a reference voltage U3=1.2 V is employed as regulator 9, then U$_{2min}$ can be ≧3.0 V.

When the diode 27 is not present, then, because of the maximally permitted base-emitter inhibit voltage of the transistor 15, U$_{BE}$≦6.8 V, the upper limit value of the output voltage U2 derives as U$_{2max}$≦6.8 V.

When the diode 27 is connected between the anode of the diode 17 and the tap a of the voltage divider 18, 19, then U$_{2max}$≦15 V can apply.

In a preferred dimensioning example, the transistors 15 and 11 are of the type BCW 66/68. The resistance ratio R18:R19 is selected such that the voltage U8 at the tap a of the voltage divider 18, 19 has the value 1.8 V. The division ratio k therefore amounts to k=0.38.

Deriving therefrom as maximum value of the base voltage U8 is $$U_{8max} = (0.6 \text{ V}) / (1 - 0.38) = 9 \text{ V}$$

The operating dependability of systems, particularly in systems of communications technology, can be enhanced with the assistance of the circuit arrangement in that two or more power supply devices are operated parallel. The output circuits of the power supply devices that feed the system for the purpose of redundancy are thereby applied to a common bus bar via decoupling diodes. Although a high precision or, respectively, low tolerance of, for example, ±2% is required for the voltage at this bus bar given a low absolute value, for example 4.8 V, and the range of load current is relatively large, extending, for example, from 0-8 A, one of the two power supply devices can spell the other practically undelayed.

The apparatus connected first, for example the apparatus 2, defines the voltage lying at the bus bar 25. The measured value supplied by the ohmic voltage divider 18, 19, however, does not lie at the input of the regulator 9 of the apparatus 1 that has not yet been activated because of the inhibit effect of the collector-base or, respectively, emitter-base path of the transistor 11. No problem arises upon cut-in of the apparatus 1. The actual value coming from the voltage U2 is not immediately offered to the regulator 9. The device 20 for actual value formation can only operate when the voltage U12 has come into the proximity of its nominal value.

The power supply device 1 can start up and generate the required output voltage U2. The apparatus 1 can therefore achieve the correct operating condition without further ado.

The circuit arrangement is especially suited for redundant feed of devices of electrical message transmission technology.

The present invention is not limited to the particular details of the apparatus depicted and other modifications and applications are contemplated. Certain other changes may be made to the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for generating a dc voltage regulated to a constant value, having two output terminals to which an electrical user or an output of at least one further identical circuit arrangement is connected, comprising:

a first output terminal of the two output terminals lying at a reference potential;

a decoupling diode in a current path leading to a second output terminal of the two output terminals;

an arrangement for actual value formation having a first transistor whose base is connected to a tap of an ohmic voltage divider connected between the first and second output terminals, whose emitter is connected via a first resistor to the decoupling diode, and whose collector is operationally connected to the reference potential;

a regulator having a reference voltage terminal, an actual value voltage input and a control voltage terminal, the regulator at least approximately eliminating deviations of the actual value voltage output by the arrangement for actual value formation from a reference voltage;

the emitter of the first transistor connected to a base of a second transistor whose collector is connected to the decoupling diode;

the first transistor and the second transistor having opposite conductivity types;

a series circuit of a second resistor and the emitter-collector path of the second transistor connected between the actual value voltage input of the regulator and the decoupling diode, and a third resistor connected between the actual value voltage input of the regulator and the first output terminal; and the control voltage output of the regulator connected via a fourth resistor to the decoupling diode.

2. The circuit arrangement according to claim 1, wherein the first transistor and the second transistor are complementary-identical transistors.

3. The circuit arrangement according to claim 1, wherein the first transistor and the second transistor are tightly thermally coupled.

4. The circuit arrangement according to claim 3, wherein the circuit arrangement further comprises a third transistor, the third transistor having a collector connected to a light-emitting diode of an optocoupler that is connected to the reference potential, a base connected to the output terminal of the regulator, and an emitter operationally connected to the decoupling diode.

5. A circuit arrangement for generating a dc voltage regulated to a constant value, having two output terminals to which an electrical user or an output of at least one further identical circuit arrangement is connected, comprising:

a first output terminal of the two output terminals lying at a reference potential;

a decoupling diode in a current path leading to a second output terminal of the two output terminals;

an arrangement for actual value formation having a first transistor whose base is connected to a tap of an ohmic voltage divider connected between the first and second output terminals, whose emitter is connected via a first resistor to the decoupling diode, and whose collector is operationally connected to the reference potential;

a regulator having a reference voltage terminal, an actual value voltage input and a control voltage terminal, the regulator at least approximately eliminating deviations of the actual value voltage output by the arrangement for actual value formation from a reference voltage;

the emitter of the first transistor connected to a base of a second transistor whose collector is connected to the decoupling diode;

the first transistor and the second transistor having opposite conductivity types, the first transistor and the second transistor being tightly thermally coupled;

a third transistor having a collector connected to a light-emitting diode of an optocoupler that is connected to the reference potential, a base connected to the output terminal of the regulator, and an emitter operationally connected to the decoupling diode;

a series circuit of a second resistor and the emitter-collector path of the second transistor connected between the actual value voltage input of the regulator and the decoupling diode, and a third resistor connected between the actual value voltage input of the regulator and the first output terminal; and the control voltage output of the regulator connected via a fourth resistor to the decoupling diode.

6. The circuit arrangement according to claim 5, wherein the first transistor and the second transistor are complementary-identical transistors.

7. A circuit arrangement for generating a dc voltage regulated to a constant value, having two output terminals to which an electrical user or an output of at least one further identical circuit arrangement is connected, comprising:

a first output terminal of the two output terminals lying at a reference potential;

a decoupling diode connected to a second output terminal of the two output terminals;

an arrangement for actual value formation having a first transistor whose base is connected to a tap of an ohmic voltage divider connected between the first and second output terminals, whose emitter is connected via a first resistor to the decoupling diode, and whose collector is operationally connected to the reference potential;

a regulator having a reference voltage terminal, an actual value voltage input and a control voltage terminal, the regulator at least approximately eliminating deviations of the actual value voltage output by the arrangement for actual value formation from a reference voltage;

the emitter of the first transistor connected to a base of a second transistor whose collector is connected to the decoupling diode;

the first transistor and the second transistor having opposite conductivity types, the first transistor and the second transistor being tightly thermally coupled, and the first transistor and the second transistor being complimentary-identical transistors;

a third transistor having a collector connected to a light-emitting diode of an optocoupler that is connected to the reference potential, a base connected to the output terminal of the regulator, and an emitter operationally connected to the decoupling diode;

a series circuit of a second resistor and the emitter-collector path of the second transistor connected between the actual value voltage input of the regulator and the decoupling diode, and a third resistor connected between the actual value voltage input of the regulator and the first output terminal; and the control voltage output of the regulator connected via a fourth resistor to the decoupling diode.

* * * * *